US007888909B2

(12) United States Patent
Larsen et al.

(10) Patent No.: US 7,888,909 B2
(45) Date of Patent: Feb. 15, 2011

(54) CONVENIENT RECHARGING OF A CHARGE STORAGE DEVICE

(75) Inventors: Glen C Larsen, Issaquah, WA (US); James C Marshall, Puyallup, WA (US); Michael R Schweers, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 11/868,731

(22) Filed: Oct. 8, 2007

(65) Prior Publication Data
US 2009/0091290 A1 Apr. 9, 2009

(51) Int. Cl.
H02J 7/00 (2006.01)
(52) U.S. Cl. .................. 320/115; 320/107; 429/99; 429/100; 429/101
(58) Field of Classification Search .......... 320/107, 320/115
See application file for complete search history.

(56) References Cited

U.S. PATENT DOCUMENTS

| 5,525,888 | A | * | 6/1996 | Toya .................. 320/111 |
| 5,631,536 | A | * | 5/1997 | Tseng ................. 320/137 |
| 5,668,460 | A | * | 9/1997 | Lashlee et al. ............ 320/109 |
| 5,870,615 | A | | 2/1999 | Bar-On et al. |
| 6,211,649 | B1 | | 4/2001 | Matsuda |
| 6,531,244 | B1 | * | 3/2003 | Ryan et al. .............. 429/100 |
| 6,531,845 | B2 | | 3/2003 | Kerai et al. |
| 6,663,420 | B1 | | 12/2003 | Xiao |
| 6,955,863 | B2 | * | 10/2005 | Bean et al. ............... 429/96 |
| 7,158,815 | B2 | | 1/2007 | Roh |
| 2002/0038432 | A1 | | 3/2002 | Hsu |
| 2003/0098850 | A1 | | 5/2003 | Jzuhsiang |
| 2005/0156561 | A1 | * | 7/2005 | Yu et al. .................. 320/107 |
| 2006/0170393 | A1 | * | 8/2006 | Yang ..................... 320/107 |

OTHER PUBLICATIONS

"USBCell Batteries", retrieved on Jun. 20, 2007, at <<http://www.firebox.com/?dir=firebox&action=product&aff=1108&pid=1625>>, pp. 1-5.
"IOGEAR's USB RF Wireless Optical Mini Mouse", retrieved on Jun. 20, 2007 at <<http://www.pcwb.com/catalogue/item/IOGEA69?speedtrapid=froogle&lead=froogle>>, pp. 1-2.
"Trust Wireless Optical Mini Mouse MI-4800", retrieved on Jun. 20, 2007 at <<http://cgi.ebay.co.uk/Wireless-Optical-Mini-Mouse-MI-4800p-NEW-TRUST-IN-STOCK_W0QQitemZ160066759906QQihZ006QQcategoryZ96891QQtcZphotoQQcmdZViewItem?refid=store>>, pp. 1-4.

* cited by examiner

*Primary Examiner*—Edward Tso
*Assistant Examiner*—Samuel Berhanu
(74) *Attorney, Agent, or Firm*—Alleman Hall McCoy Russell & Tuttle LLP

(57) ABSTRACT

The convenient recharging of a charge storage device is disclosed. In one embodiment, a system comprises a portable device accessory with a charge storage device holding mechanism and a recharging circuit. The system also comprises a portable device with an interface at which the portable device and the portable device accessory are connectable. A charge storage device-switching mechanism is disposed within the portable device accessory or the portable device. The charge storage device-switching mechanism is actuatable to switch a first charge storage device in the portable device with a second charge storage device in the charge storage device holding mechanism of the portable device accessory by mechanically connecting and/or disconnecting the portable device from the portable device accessory.

15 Claims, 7 Drawing Sheets

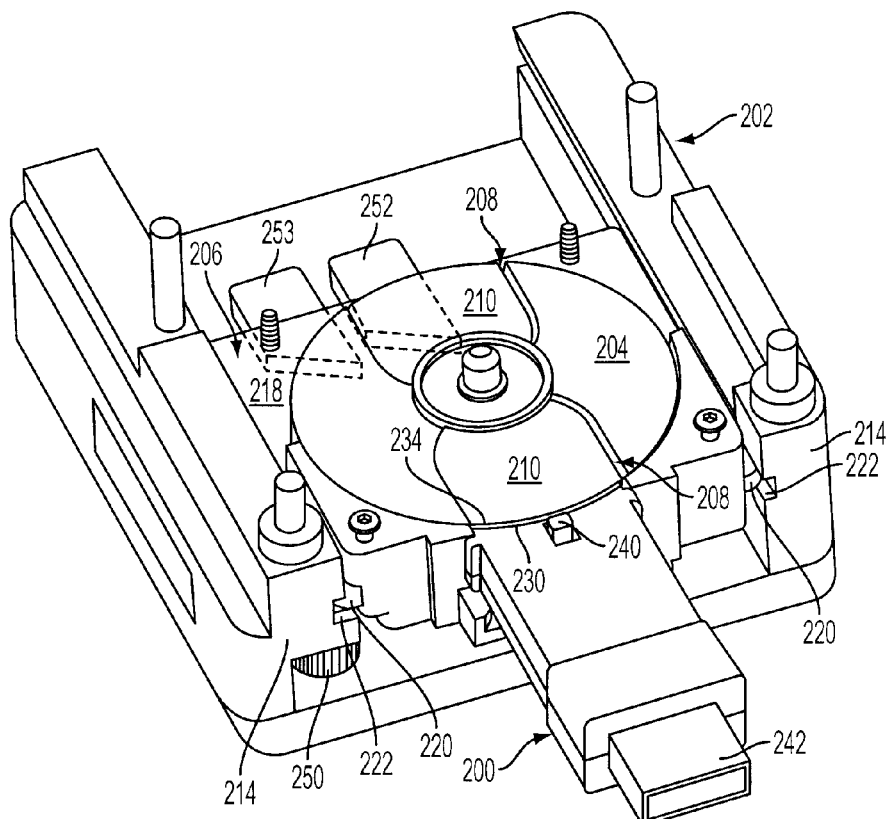
FIG. 3
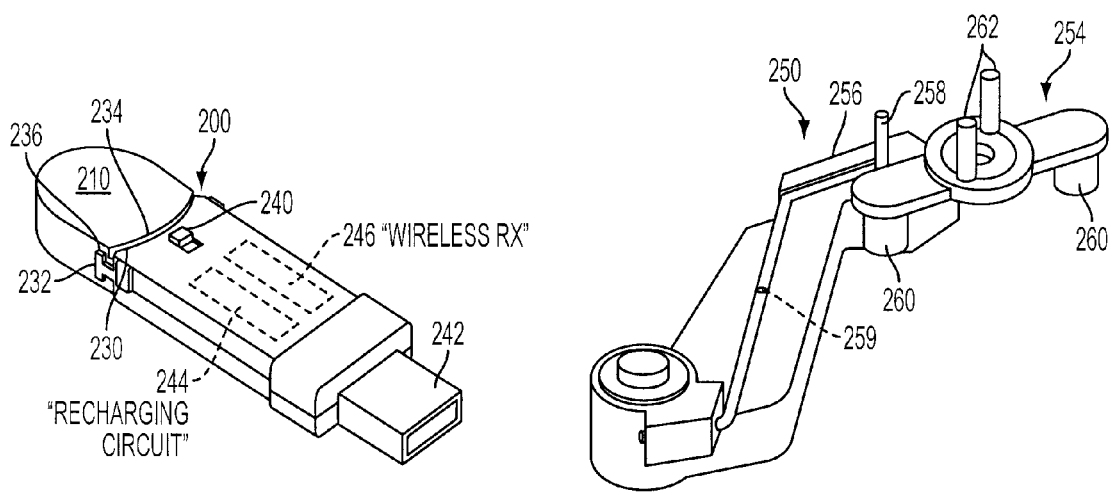
FIG. 4
FIG. 5

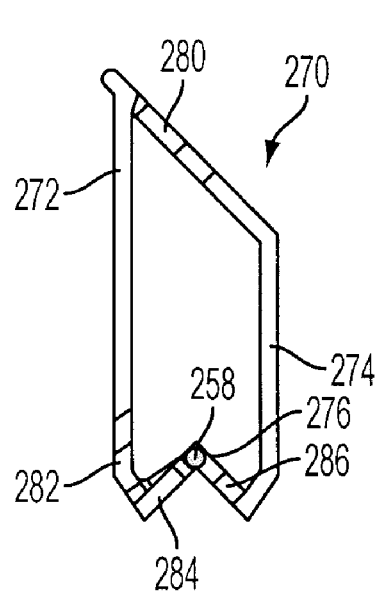 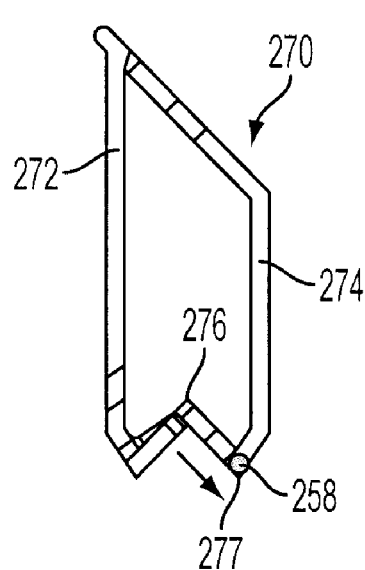 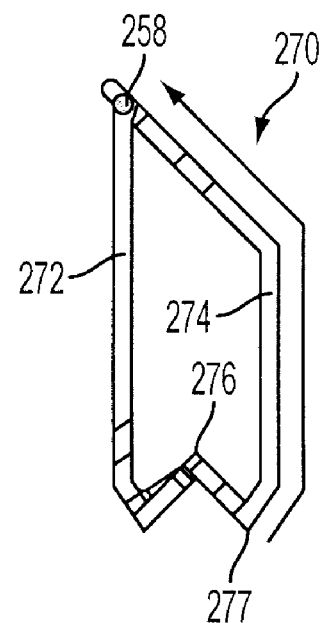
FIG. 7A    FIG. 7B    FIG. 7C
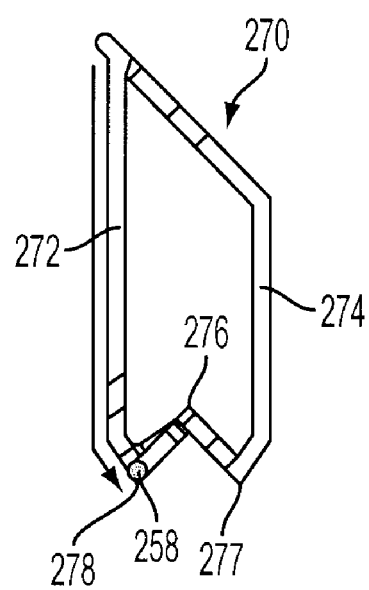 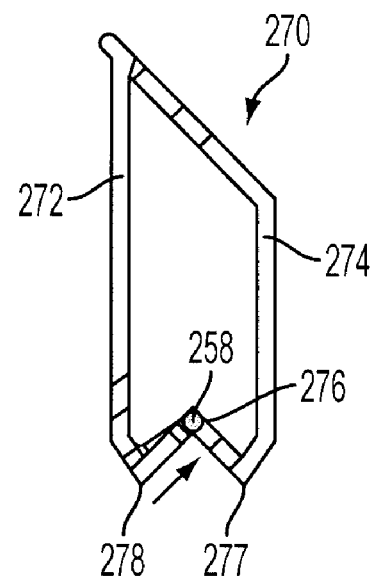
FIG. 7D    FIG. 7E

CONVENIENT RECHARGING OF A CHARGE STORAGE DEVICE

BACKGROUND

Portable electric and electronic devices provide users with freedom from power cords and other such power connections, but also have the drawback of periodic recharging or replacement of a charge storage device used to power the portable device, such as a battery. Battery replacement or recharging may be inconvenient for a user, for example, where replacement batteries are not close at hand, or where work must be interrupted to allow rechargeable batteries to recharge.

To overcome such issues, a user may carry a battery charger and an extra battery to allow one battery to be charged while another is in use. However, carrying a charger may be bulky and inconvenient. Likewise, a user may carry an extra charged battery so that the user has a second battery ready for use if the first battery runs out of charge during use. However, carrying an extra charged battery doubles the amount of manual recharging performed later. Further, where a long time between recharging is desired, an extra battery of sufficient size to hold a charge for a desired length of time may be relatively large and costly.

SUMMARY

Accordingly, the convenient recharging of a charge storage device is disclosed below in the Detailed Description. In one disclosed embodiment, a system comprises a portable device accessory with a charge storage device holding mechanism and a recharging circuit. The system also comprises a portable device with an interface at which the portable device and the portable device accessory are mechanically connectable. Further, a charge storage device-switching mechanism is disposed within the portable device accessory or the portable device. Mechanically connecting and/or disconnecting the portable device and the portable device accessory actuates the charge storage device-switching mechanism to switch a first charge storage device in the portable device with a second charge storage device in the charge storage device holding mechanism of the portable device accessory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows embodiments of a sliding tray assembly and a turntable of the charge storage device-switching mechanism of FIG. 2.

FIG. 4 shows an embodiment of a portable device accessory.

FIG. 5 shows embodiments of a pawl, pawl guide and rotating post assembly of the charge storage device-switching mechanism of FIG. 2.

FIGS. 7A-E illustrate a path of travel of a pawl guide around the pawl groove of the embodiment of FIG. 6.

DETAILED DESCRIPTION

Figure 1:
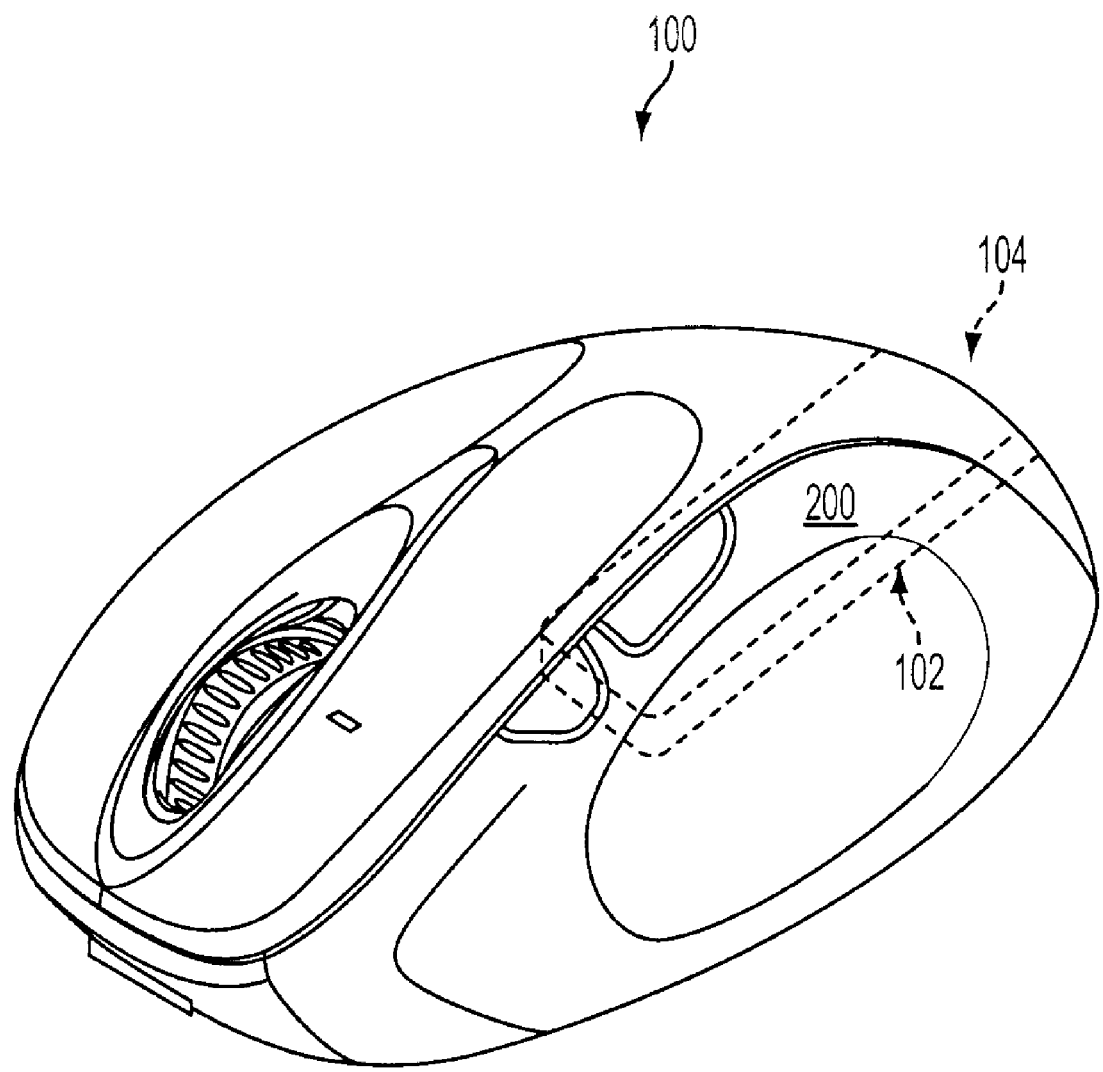
FIG. 1 shows an embodiment of a portable device and a portable device accessory removably stored within the portable device.

FIG. 1 illustrates a portable device 100 in the form of a portable computer mouse. Portable device 100 is wireless, and therefore utilizes one or more batteries as a power source, as described in more detail below. Portable device 100 comprises a storage area 102 configured to store a portable device accessory 200 such as a wireless receiver. The storage area 102 comprises an opening or interface 104 through which the wireless accessory 200 may be inserted for storage and removed for use.

While the embodiments described herein are shown in the context of a computer mouse, it will be appreciated that the disclosed embodiments may be used in any other suitable portable device. Examples of other suitable portable devices include, but are not limited to, other computer input devices such as portable keyboards, joysticks trackballs, mouse pads, etc.; other electronic devices such as cellular phones, digital cameras and video cameras, portable audio players, etc.; electrical tools such as cordless power drills, screwdrivers, hand vacuums, etc.; and any other device that may utilize rechargeable batteries. Examples of portable device accessories that may be used with such devices include, but are not limited to, battery chargers, wireless receivers, docking stations, earphones, headsets, interchangeable lenses, additional memory or media packs, custom tips or interfaces, controllers, storage devices, etc.

The use of portable device 100 may pose difficulties where a rechargeable battery, capacitor or other charge storage device that powers portable device 100 runs out of charge during use. To guard against such an occurrence causing a disruption in work, a user may carry replacement rechargeable or non-rechargeable batteries that can be switched for the discharged batteries. However, this requires the user to remember to carry the batteries, and may be inconvenient in some situations.

To overcome such problems, the embodiments described herein are configured to enable the convenient recharging of one battery during the use of another battery. For example, as described in more detail below, the portable device accessory 200 schematically depicted in FIG. 1 is configured to recharge a battery while being used in its ordinary and intended use as a wireless receiver.

Figure 2:
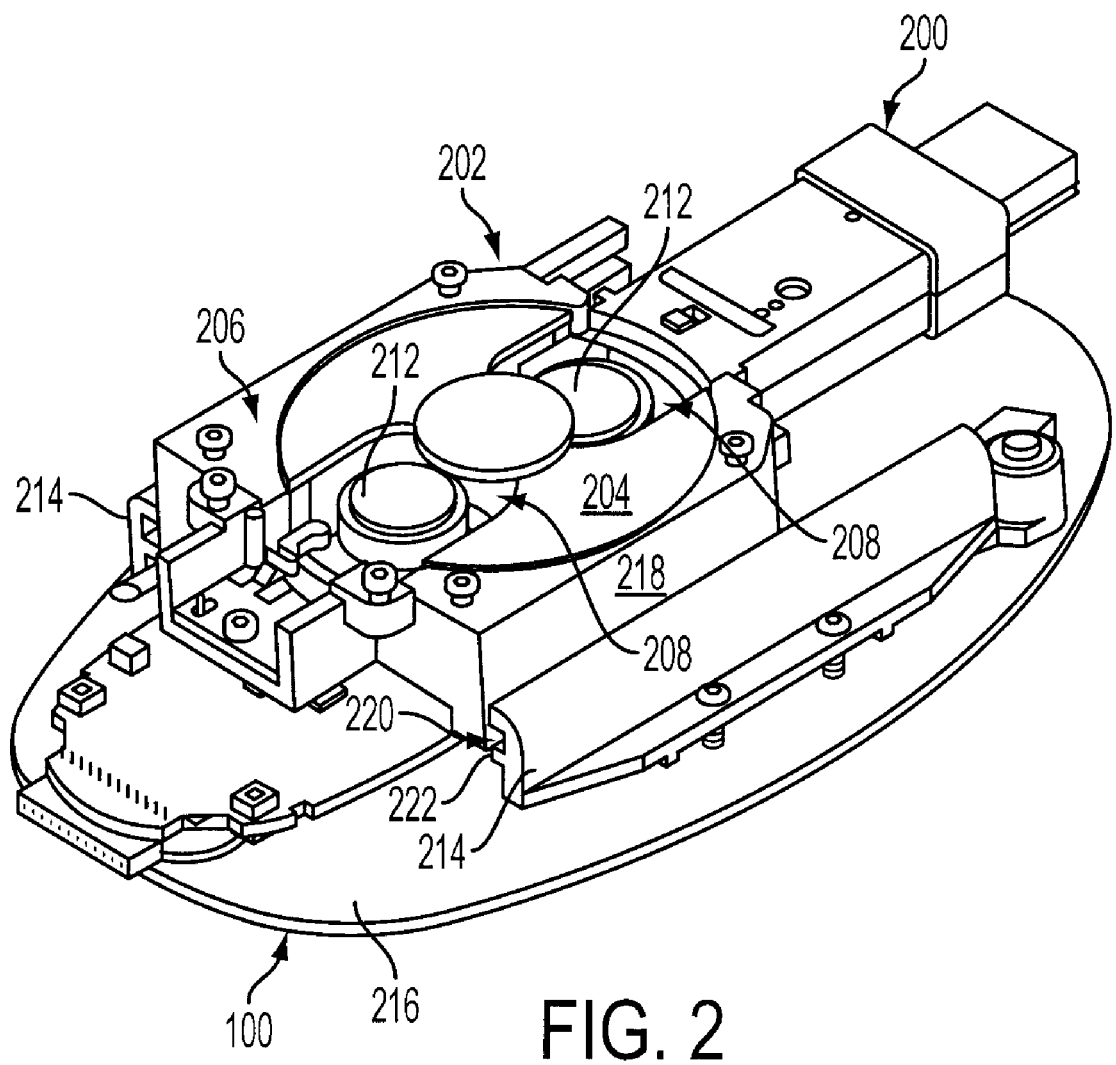
FIG. 2 shows an embodiment of a charge storage device-switching mechanism disposed within the portable device of FIG. 1.

Further, the portable device 100 and/or the portable device accessory 200 may comprise a charge storage device-switching mechanism, shown generally at 202 in FIG. 2. The depicted charge storage device-switching mechanism 202 may also be referred to as a battery-switching mechanism 202 herein. The battery-switching mechanism 202 is configured to automatically switch a newly-charged battery coupled with the portable device accessory 200 with a partially or fully discharged battery contained within the portable device 100 when the portable device 100 is mechanically connected to the portable device accessory 200. The terms "mechanically connected", "mechanically connecting" and the like as used herein refers to any touching, joining or coupling of the portable device 100 and portable device accessory 200 that causes actuation of a battery-switching mechanism contained within the portable device 100 and/or the portable device accessory 200.

While the depicted embodiments are described herein primarily in the context of the switching of batteries, it will be appreciated that the disclosed embodiments may also be used to switch other charge storage devices, including but not limited to capacitors. As used herein, the term "capacitor" may refer to an ordinary capacitor, supercapacitor, ultracapacitor, or any other device that stores charge via capacitance. Likewise, the term "charge storage device" may refer to a battery, capacitor (plus any additional circuitry), or other device capable of storing charge for use in powering another device or recharging a battery, capacitor, etc. in another device.

While the battery-switching mechanism 202 shown in FIG. 2 is depicted as being contained within the portable device 100, it will be appreciated that a battery-switching mechanism may also be contained within a portable device accessory, and/or may include parts disposed within both the device and device accessory. Generally, the decision of whether to include a battery-switching mechanism within a device or device accessory may be based upon factors such as the relative sizes of the device or device accessory, whether the device or device accessory is configured to be connected to a power supply during ordinary use, etc.

Referring next to FIGS. 2 and 3, the battery-switching mechanism 202 comprises a turntable 204 disposed on a sliding tray assembly 206. The turntable 204 comprises a plurality of battery holder receptacles 208 positioned at periodic locations around the turntable 204. The depicted embodiment comprises two battery holder receptacles disposed one-hundred-eighty degrees from each other. However, it will be appreciated that a turntable may include any other suitable number of battery holder receptacles 208 located at any suitable positions on the turntable 204.

Each battery holder receptacle is configured to receive and hold a battery holder 210. Each battery holder 210, in turn, is configured to hold one or more rechargeable batteries. FIG. 2 depicts the location at which two rechargeable batteries 212 are positioned in the turntable 204 when the portable device accessory 200 is located in a storage position within the portable device 100 (the battery holders 210 are omitted from FIG. 2), and FIG. 3 shows a battery holder 210 positioned within each battery holder receptacle 208. Each battery holder 210 comprises contacts (not shown) disposed within the battery holder 210 configured to contact complementary contacts on the battery 212, and also contacts (not shown) disposed on the outside of the battery holder 210 to contact complementary contacts connected to circuitry within the portable device 100 and the portable device accessory 200.

Continuing with FIGS. 2 and 3, the sliding tray assembly 206 is configured to slide along one or more guides 214 with respect to an outer body 216 of the portable device 100. As described in more detail below, inserting the portable device accessory 200 into the storage area 102 within the portable device 100 causes the sliding tray assembly 206 to slide along guides 214. This motion causes the rotation of turntable 204, thereby switching the position of the two battery holders 210 within the portable device 100. In this manner, the battery 212 that was attached to the portable device accessory 200 while the portable device accessory 200 was connected to a computer (or other power source) during a previous use cycle is rotated into position to power portable device 100 during a next use cycle. Likewise, the battery 212 that was used to power the portable device 100 during a previous use cycle is rotated into a position in which it is coupled to the portable device accessory 200 for recharging during a next use cycle.

Further, in some embodiments, the recharged battery that is switched into the portable device 100 may be used to add charge to another charge storage device (not shown), such as a battery or capacitor, that is contained more permanently in the portable device 100 or in the portable device accessory. In yet other embodiments, instead of a battery, a capacitor or other charge storage device may be switched into the portable device 100 or portable device accessory 200 to transfer charge to the more permanent charge storage device.

In this manner, the battery of the portable device 100 is changed by the act of stowing the portable device accessory 200 in an intended storage location within the portable device 100. Further, a spent battery from the portable device 100 is charged by plugging the portable device accessory 200 into a computing device to act as a wireless receiver for the portable device 100. Therefore, the charging of the spent battery occurs during the ordinary course of use of the portable device 100 and the portable device accessory 200 without the performance of any additional user steps.

The sliding tray assembly 206 comprises a sliding tray body 218 to which the turntable 204 is rotatably coupled. The sliding tray body 218 comprises a tongue 220 disposed on each side, wherein each tongue is configured to slide within a complementary groove 222 in each guide 214. The tongue-and-groove connection between sliding tray body 218 and each guide 214 helps to ensure that the sliding tray assembly 206 follows a correct path to cause rotation of the turntable 204. It will be appreciated that any other interface than a tongue-and-groove joint may be used that enables the one-dimensional travel of the sliding tray assembly 206. In general, such a joint or interface may be referred to herein as a "one-dimensional joint 222", and the individual structures that form the joint may be referred to as "one-dimensional joint structures." One such example comprises a rod-and-hole connector. Further, it will be appreciated that structures such as bearings, wheels, etc. may be employed to facilitate the movement of sliding tray assembly 206 where suitable.

Referring next to FIGS. 3 and 4, the portable device accessory 200 comprises a battery holding mechanism (or other charge storage device holding mechanism, such as a capacitor storing mechanism) configured to hold a battery for recharging. The battery holding mechanism comprises a curved end portion 230 of the portable device accessory and a tongue 232 each with concave curvature that is concentric to the convex curvature of the outer edge of the turntable 204. Likewise, each battery holder 210 also has an outer edge 234 with a groove 236 having convex curvature that is concentric to the concave curvature of the tongue 232. This allows the battery holder to be rotationally connected to and disconnected from the portable device accessory 200 by rotation of the turntable 204. In an alternative embodiment, tongue 232 may be disposed on the battery holder 210 and the groove 236 on the portable device accessory 200. Further, it will be understood that any other set or type of joint or interface may be used to allow the battery holder 210 to be joined to and removed from the portable device accessory 200 without departing from the scope of the present disclosure.

The portable device accessory 200 further comprises a latching mechanism configured to hold a battery holder 210 in place on the portable device accessory 200 when the portable device accessory 200 is in use. The latching mechanism comprises a latch release member 240 that is configured to be pushed into a "release" position (i.e. a position that allows the battery holder 210 to be rotated free of the portable device accessory 200) when the portable device accessory is inserted into the interface 104 of the storage area 102. In this manner, the battery holder 210 is latched onto the portable device accessory 200 when removed from the storage area 102 within the portable device 100, but is released for battery switching when the portable device accessory 200 is inserted into the storage area 102.

The portable device accessory 200 also comprises a connector 242 that enables the portable device accessory 200 to be electrically and mechanically connected to a computing device or other suitable device with a complementary connector. Further, the portable device accessory 200 comprises a recharging circuit 244 configured to recharge a battery coupled to the portable device accessory, and a wireless receiver circuit 246 configured to receive a signal from the portable device 100. While the recharging circuit is disposed within the portable device accessory 200 in the depicted embodiment, it will be appreciated that circuitry for recharging the battery may alternatively or also be disposed within a powered device or power source to which the portable device accessory 200 is connected, such as a laptop or desktop computer. Furthermore, while the depicted portable device accessory embodiment comprises the additional functionality of a wireless receiver, it will be understood that other embodiments may include any other suitable additional functionality, or may comprise no additional functionality other than battery recharging capabilities, without departing from the scope of the present disclosure. Additionally, in some embodiments, the recharging circuit 244 may be configured to provide a recharging current via electromagnetic induction from a powered device. In these embodiments, the portable device accessory may be free of any physical connection to the powered device during recharging, therefore allowing the omission of the connector 242.

The mechanism controlling the rotation of turntable 204 will now be described. Referring briefly back to FIG. 3, a pivoting end of a pawl 250 is located adjacent to a face of the sliding tray assembly 206. Further, one or more guide structures 252, 253 are located on an interior surface of the body 216 of the portable device 100. The pawl 250 and the guide structures 252, 253 are each configured to interact with a rotation post structure 254 coupled to turntable 204.

The structures of the pawl 250 and rotation post structure 254 are shown in FIG. 5. First, the pawl 250 comprises an elongate pawl arm 256, and also a pawl guide 258 with an upturned end configured to travel in a complementary groove (described below) located on the bottom of the sliding tray body 218. The pawl 250 may rest on a fulcrum 259 to allow the upturned end of the pawl 250 to be displaced in a direction normal to the direction of travel of the pawl arm, as described below. The pawl guide 258 of the depicted embodiment comprises a wire, but it will be appreciated that any suitable structure other than a wire may be used.

Next, the rotation post structure 254 includes a pair of rotation posts 260 and coupling pins 262. The coupling pins 262 are configured to fix the rotation post structure 254 to the turntable 204, and the rotation posts 260 are configured to contact the pawl arm 256 and the guide structures 252, 253 to cause rotation of the turntable 204 as the sliding tray assembly 206 is pushed inwardly relative to these parts. It will be appreciated that the rotation post structure 254 may be coupled to the turntable 204 in any other suitable manner other than with coupling pins 262. It will further be appreciated that more than two rotation posts may be used where the battery switching mechanism is configured to utilize more than two batteries.

Figure 6:
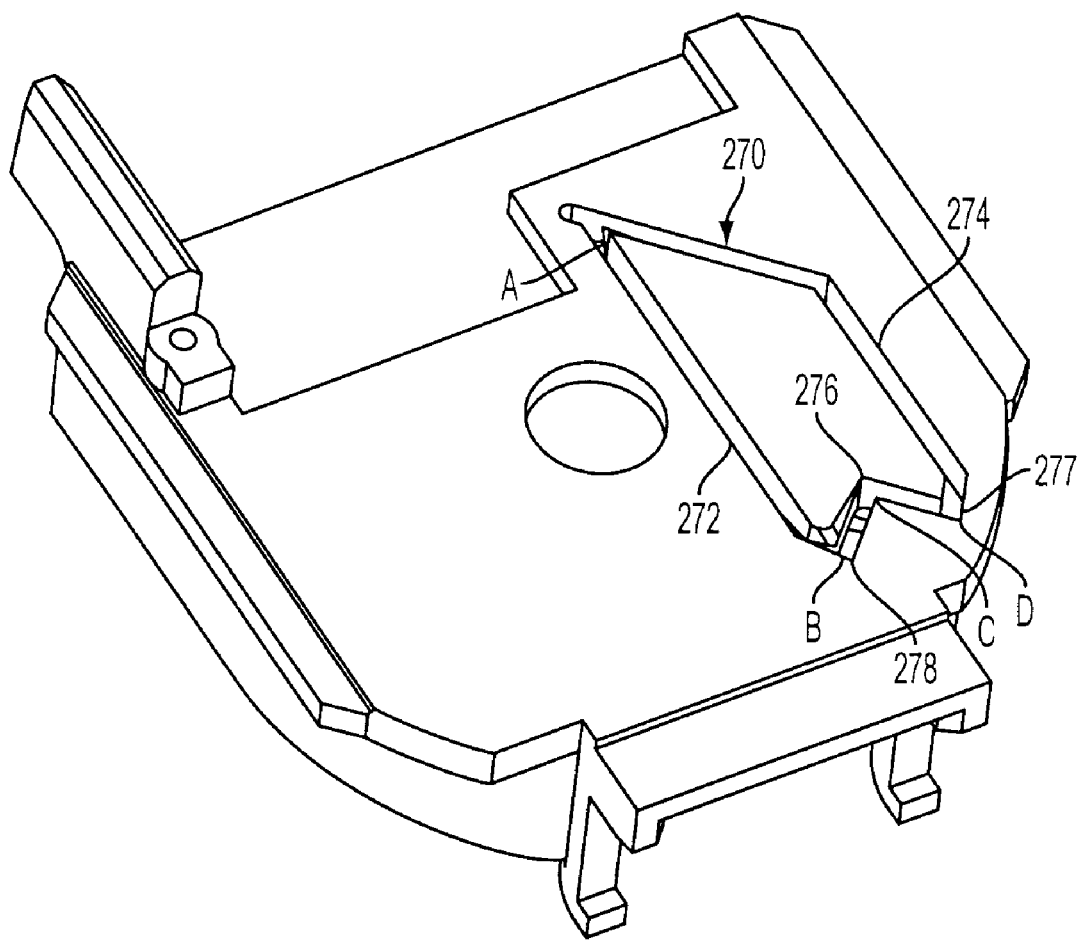
FIG. 6 shows a view of an embodiment of a pawl groove located on a face of an embodiment of a sliding tray assembly of the charge storage device-switching mechanism of FIG. 2.

FIG. 6 shows a view of an opposite face of the sliding tray body 218 as that shown in FIG. 3. The sliding tray body 218 comprises a pawl groove 270 in which pawl guide 258 travels when the sliding tray assembly 206 is moved along the one dimensional joint 222. The pawl groove 270 defines a closed path around which the pawl guide 258 travels, and comprises an inward portion 272 located farther from an edge of the sliding tray body 218 and an outward portion 272 located closer to an edge of the sliding tray body 218. Motion of the pawl guide 258 within the inward portion 272 causes pawl 250 to be held in a suitable position to contact a rotation post 260 when the sliding tray body 218 is pushed by the insertion of the portable device accessory 200 into the storage area 102. This motion may be provided by a user pushing the portable device accessory 200 into the storage area 102, possibly against a biasing spring force. It should be understood that, while the depicted embodiment shows the pawl groove 270 formed in the sliding tray body 218 and the pawl guide 258 disposed on the pawl arm 256, the location of these parts may be reversed such that the sliding tray body 218 comprises a track protruding outwardly in which the end of the pawl slides, the end of the pawl containing a slot which surrounds the protrusion. Further, any other suitable mechanism may be used to link motion of the pawl arm 256 to motion of the sliding tray body 218.

Motion of the pawl guide 258 within the pawl groove 270 is illustrated by FIGS. 7A-7E. First referring to FIG. 7A, during storage of the portable device accessory 200 in the storage area 102 of the portable device 100, the pawl guide 258 is held via a biasing spring (not shown) in a v-shaped (or other suitably shaped) notch 276 defined by the pawl groove 270 to hold the sliding tray assembly 206 in a storage position.

Next referring to FIG. 7B, a user may remove the portable device accessory 200 from the storage area 102 by pushing an end of the portable device accessory that is accessible from the interface 104 This motion causes the sliding tray assembly 206 to slide inwardly (i.e. downward in FIG. 7B from the apex of the v-shaped notch 276), thereby causing the pawl guide 258 to move along the pawl groove 270 out of the notch 276, toward an outward apex 277, and into the outward portion 272, as shown in FIG. 7C. This causes the pawl arm 256 to swing out of the way of the rotation posts 260 as the sliding tray assembly 206 is moved toward the interface 104 to an accessory removal position by the biasing spring (not shown), thereby pushing the portable device accessory 200 out of the interface. This permits removal of the portable device accessory 200 without causing rotation of the turntable, thereby leaving the last-used battery coupled to the portable device accessory. After the rotation posts 260 have passed the pawl arm 256, the pawl guide 258 follows groove 270 as it turns to travel toward and meet the inward portion 272 for a next insertion of the portable device accessory.

Next referring to FIG. 7D, upon re-insertion of the portable device accessory 200 (with the newly charged battery) into the storage area 102, the pawl guide is pushed along the inward portion 272 of the pawl groove 270 until being moved slightly toward the edge of the sliding tray body shortly before reaching an inward apex 278. The turntable 204 is rotated as the pawl guide 258 travels along groove 272, so that the batteries are swapped prior to the pawl guide 258 coming to rest in notch 276. This location corresponds to a location at which the portable device accessory 200 is inserted fully into the storage area 102. Then, as shown in FIG. 7E, the biasing spring force moves the sliding gray assembly such that the pawl guide 258 again slides into the notch 276, retaining the portable device accessory 200 in the storage area until next use.

Figure 8:
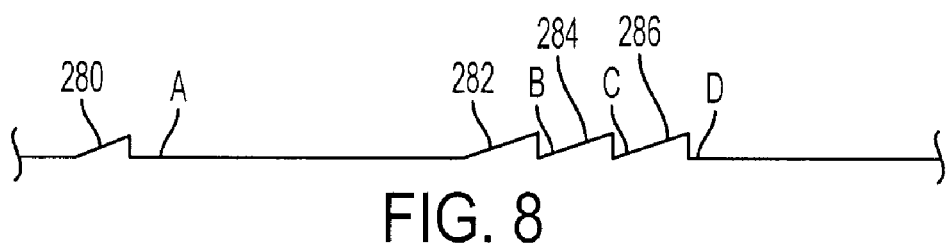
FIG. 8 shows an elevation profile of an embodiment of a pawl groove.

In some embodiments, the pawl groove 270 may include one or more ramps configured to prevent the pawl guide 258 from moving in a wrong direction around the pawl groove 270. The presence of the fulcrum shown at 259 in FIG. 5 allows the pawl guide 258 to have some degree of travel along the direction of elevation change of the ramps. FIG. 8 shows an example of a suitable elevation profile of the pawl groove 270, wherein locations A-D shown in FIG. 8 correspond to the same designated locations in FIG. 6. In the depicted embodiment, the profile of the pawl groove 270 comprises four ramps that permit movement of the pawl guide in only one direction. A first ramp 280 is located at the beginning of the inward portion 272 of the pawl groove 270, and prevents the pawl guide 258 from traveling up the outward portion 274 of the pawl groove 270 when a user inserts the portable device accessory 200. A second ramp 282 is located just after the inward apex 278 of the pawl groove, and prevents the pawl guide 258 from moving back down the inward portion 272 of the pawl groove 270 instead of toward the notch 276 after the user has fully inserted the portable device accessory 200. A third ramp 284 is located near or at the notch 276, and prevents the pawl guide 258 from moving from the notch toward the inward portion 272 of the pawl groove 270 when a user pushes the portable device accessory 200 for removal. A fourth ramp 286 is located just after the outward apex 277 of the pawl groove 270, and prevents the pawl guide 258 from moving back into the notch 276 after a user has fully pushed the portable device accessory 200 during removal. It will be appreciated that the specific pawl groove shape and elevation profile depicted is shown for the purposes of example, and that any other suitable shape and/or elevation profile may be used for a pawl groove without departing from the scope of the present disclosure.

Figure 9A:
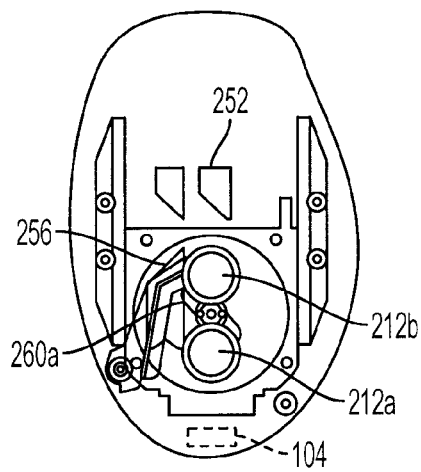
FIGS. 9A-9E illustrate a rotation of an embodiment of a charge storage device-switching mechanism as the charge storage device-switching mechanism is actuated by insertion of a portable device accessory into a portable device.
Figure 9B:
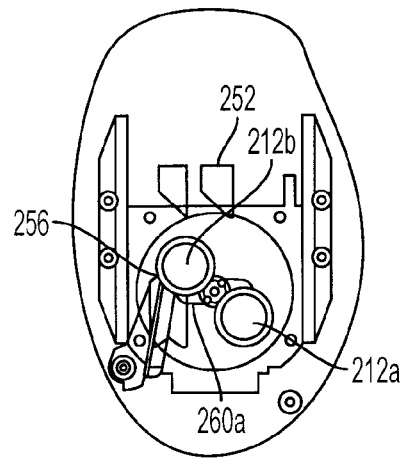
Figure 9C:
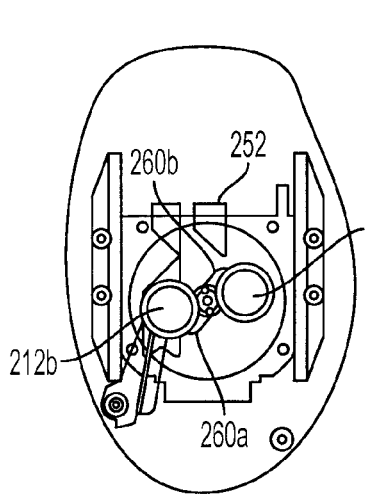

FIG. 9A-E show how the rotation post structure 254 interacts with the pawl arm 256 and guide structures 252, 253 to cause rotation of the turntable and thereby to switch a charged battery 212a connected to the portable device accessory for a spent battery 212b located within the portable device 100. First regarding FIG. 9A, when the sliding tray assembly 206 is in a position awaiting the insertion of the portable device accessory 200, the pawl arm 256 is in a position configured to contact one of the rotation posts 260 when the tray is pushed by the insertion of the portable device accessory 200. Referring next to FIGS. 9B-C, movement of the sliding tray assembly 206 inwardly away from the interface 104 causes an initial rotation of the turntable 204, as the rotation post 260a that contacts the pawl arm 256 is prevented from moving forward until it rotates past a distal end of the pawl arm 256.

Figure 9D:
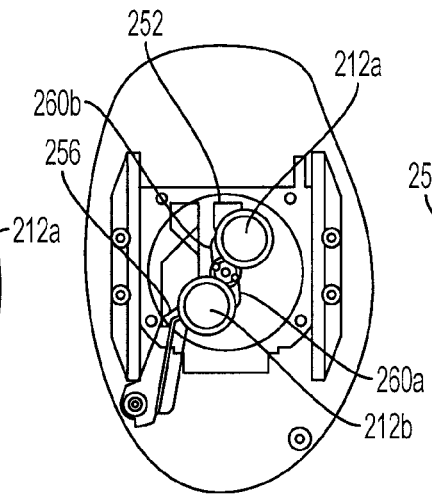
Figure 9E:
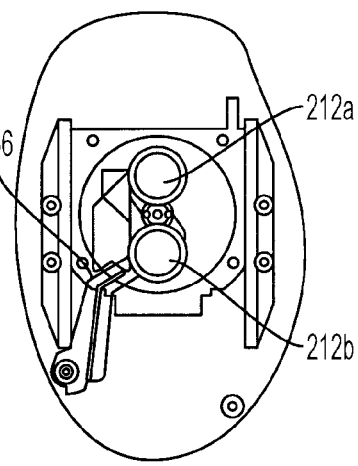

After some amount of rotation, the rotation post 260a rotates sufficiently far to disengage from the end of the pawl arm 256. At this point, the other rotation post 260b contacts guide structure 252, as shown in FIG. 9D. The guide structure comprises a surface oriented diagonally with respect to the direction of motion of the sliding tray assembly 206. This surface pushes the rotation post 260 sufficiently far to cause complete half-rotation of the turntable 204, as shown at FIG. 9E, thereby moving the spent battery 212b into a connection with the portable device accessory 200, and moving the charged battery 212a into position for powering the portable device 100. Further, the pawl arm 256 at this point has been pivoted out of the way of the rotation posts 260 by the motion of the pawl guide 258 in the pawl groove 270. Therefore, the outwardly movement of the sliding tray assembly 206 upon removal of the portable device accessory 200 will not cause the rotation of the turntable 204.

While the depicted embodiment is actuated by the insertion of the portable device accessory 200 into the storage area 102 of the mobile device 100, it will be appreciated that a similar mechanism may be used to actuate the battery-switching mechanism upon removal of the portable device accessory 200 from the storage area 102. This may be done, for example, by reversing the positions of the pawl arm 256, pawl groove 270, and guide structure 252 such that the rotation of the turntable 204 only occurs as the turntable 204 is moved toward the interface 104.

Figure 10:
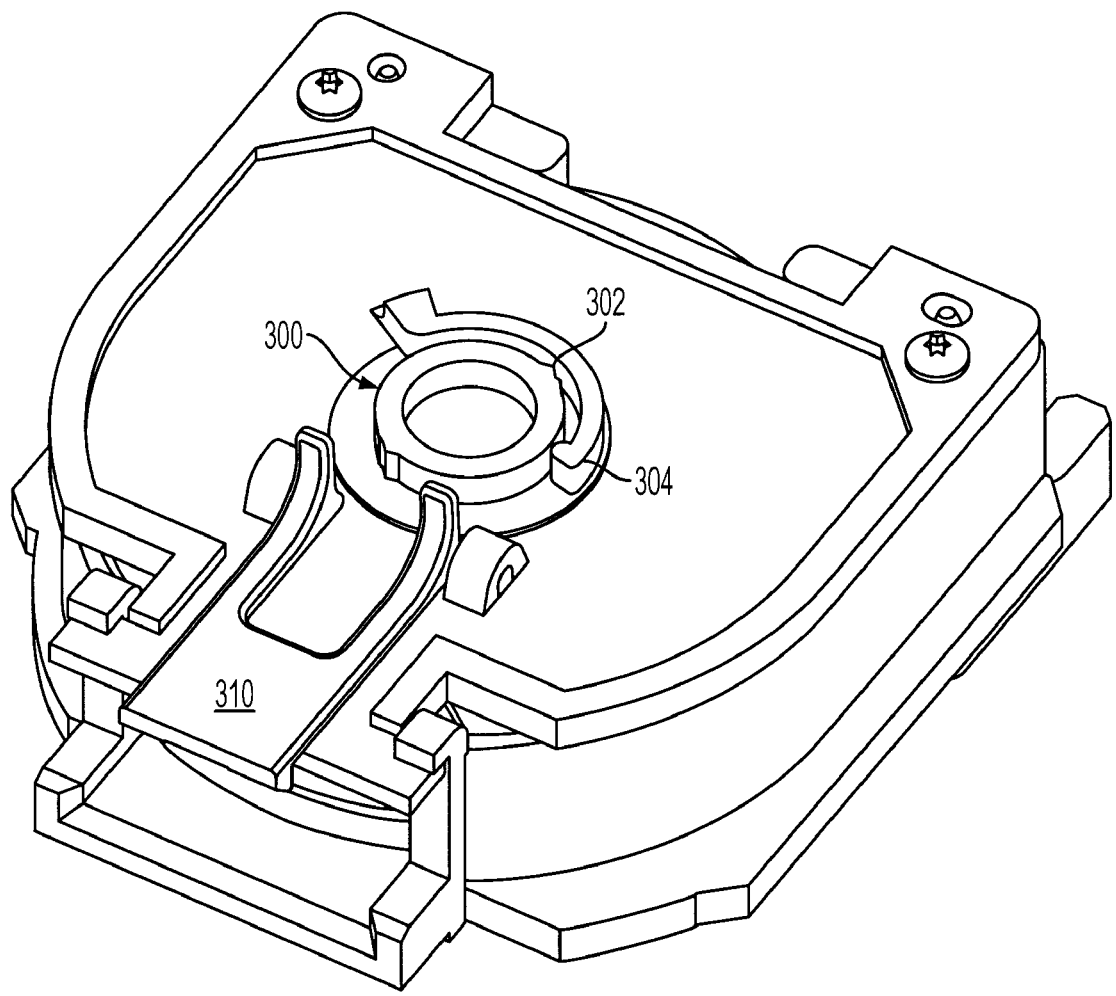
FIG. 10 shows a view of an embodiment of a rotation stop mechanism of the charge storage device-switching mechanism of FIG. 2.

FIG. 10 shows an embodiment of an over-rotation prevention mechanism that may be used to prevent over-rotation of the turntable 204 in the event that a user inserts the portable device accessory 200 into the storage area 102 at a relatively high velocity. The face of the sliding tray body 218 that is opposite the rotation post structure 254 comprises a circular structure 300 having a number of protrusions (or sets of protrusions spaced closely together) 302 equal to a number of battery holder receptacles 208 on the turntable 204. Further, the face of the sliding tray body also comprises a spring arm 304 configured to contact each protrusion or protrusion set 302 as the circular structure 300 rotates past the arm. The spring arm 304 and protrusions 302 are positioned such that each protrusion or protrusion set 302 rotates into contact with the spring arm 304 at the location at which the turntable 204 rotates into a correct position for battery use and/or removal. Thus, there the turntable has a relatively high degree of rotational inertia (for example, where a user pushes the portable device accessory 200 rapidly into the storage area 102), the force exerted by the spring arm 304 against the protrusion or protrusion set 302 may prevent the turntable from over-rotating, and therefore may prevent problems with aligning the battery holders 210 and the battery holder receptacles 208 in a next use cycle. Where sets of protrusions are utilized, at least one protrusion in each protrusion set may include a feature shape such that backward rotation of the turntable is prevented.

FIG. 10 also illustrates an embodiment of a latch 310 configured to retain the portable device accessory 200 against the turntable 204 while the batteries are being switched. During battery switching, one face of the portable device accessory 204 contacts an edge of the sliding tray assembly 206, while a hook 312 prevents removal of the portable device accessory 200 during battery switching. When battery switching is complete, a feature on the turntable 204 moves the latch 310, thereby releasing the hook 312 from the portable device accessory 200 so that the portable device accessory 200 may be removed from the portable device 100. In an alternative embodiment, the portable device accessory 200 may be retained during battery switching by utilizing a turntable 204 that turns only partially upon insertion of the portable device accessory 200 such that hook 312 is not released. The half-rotation (or other lesser amount of rotation for a different number of batteries) and battery switching process is completed upon pushing the portable device accessory 200 for removal, at which point a feature on turntable 204 releases hook 312 to allow removal of the portable device accessory 200.

In this manner, one battery may be charged while another battery is used without requiring any additional user steps other than those for the ordinary use of the device in the absence of changing batteries. Therefore, the battery charging and replacement process becomes transparent in that it requires no user action other than the possible occasional replacement of a battery that has lost the ability to store charge.

In the depicted embodiment, the battery-switching mechanism is located in the portable device, as the portable device accessory is a smaller component in the depicted system. However, in other systems within the scope of the present disclosure, the portable device accessory may be larger than the portable device, and therefore may be a more suitable location for the battery-switching mechanism.

For example, a digital camera, portable web cam, or video camera may be configured to be recharged on a portable device accessory in the form of a docking station. In this situation, the docking station may include a battery-switching mechanism and battery charging circuit that allows one or more batteries to be charged while the portable device is in use away from the docking station. In the event that a battery fails during use of the portable device, a user may simply reconnect the portable device to the docking station to thereby switch the spent battery for a newly-charged battery in a manner similar to that described above. The spent battery can thus be recharged while the user uses the newly charged battery in the portable device.

While described in the context of a portable wireless computer input device and wireless receiver, it will be appreciated that the concepts described herein may be extended to any other suitable use environment, including but not limited to consumer electronic devices such as cell phones, digital cameras and video cameras, power tools, etc. Further, while the disclosed battery-switching mechanism utilizes a rotating turntable to perform the battery switch, it will be appreciated that other mechanisms may also be utilized, including but not limited to elevator-style vertical switching mechanisms, a toggle-style switching mechanism that switches batteries between two separate battery holders within the portable device, and any other suitable battery-switching mechanism.

Additionally, while the disclosed embodiment shows a turntable configured to hold two batteries, it will be appreciated that the turntable may be configured to hold three or more batteries, wherein the turntable is configured to rotate a new battery into a use position each time the portable device accessory is connected to the portable device.

It will further be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system comprising:
a portable device accessory comprising charge storage device recharging circuit;
a portable device comprising an interface at which the portable device and the portable device accessory are connectable;
a charge storage device holding mechanism disposed within the portable device accessory and a mechanical charge storage device-exchanging mechanism disposed within the portable device or vise-versa, wherein the mechanical charge storage device-exchanging mechanism and the charge storage device holding mechanism are actuatable to exchange a first charge storage device in the portable device with a second charge storage device in the portable device accessory by mechanically connecting and/or disconnecting the portable device to and/or from the portable device accessory.

2. The system of claim 1, wherein the portable device is a wireless computer input device and wherein the device accessory comprises a wireless receiver.

3. The system of claim 1, wherein the charge storage device-switching mechanism comprises a turntable disposed within the portable device and configured to hold two or more charge storage devices.

4. The system of claim 3, wherein the charge storage device-switching mechanism further comprises a sliding tray to which the turntable is rotatably coupled and which is configured to slide relative to a body of the portable device.

5. The system of claim 4, further comprising a rotation post coupled to the turntable and a pawl coupled to the body of the portable device, the pawl being configured to engage the rotation post when the portable device accessory is inserted into the interface such that movement of the sliding tray away from an opening of the interface causes rotation of the tray, and also being configured to swing out of a path of the rotation post when the portable device accessory is removed from device.

6. The system of claim 5, wherein the pawl further comprises a pawl guide and wherein the sliding tray comprises a face with a pawl groove within which the pawl guide travels as the sliding tray is moved.

7. The system of claim 6, wherein the pawl groove comprises a notch configured to retain the sliding tray in a portable device accessory storage position when the pawl guide is located in the notch, and wherein the sliding tray can be pushed to cause the pawl guide to move from the notch and to allow the sliding tray to move to a portable device accessory removal position closer to an opening of the interface.

8. The system of claim 4, further comprising an over-rotation prevention mechanism comprising a circular member having one or more protrusions, and an arm configured to contact the protrusions as the circular member rotates.

9. The system of claim 1, wherein the charge storage device holding mechanism comprises a charge storage device holder engagable with a latch on the portable device accessory.

10. The system of claim 9, wherein the charge storage device holding mechanism further comprises one or more of a one-dimensional joint structure configured to connect to a complementary structure on the charge storage device holder.

11. a system comprising:
a portable wireless input device comprising a portable device accessory interface;
a portable device accessory connectable to another device and comprising a wireless receiver circuit, a battery holding mechanism and a recharging circuit; and
a mechanical battery-exchanging mechanism disposed within the input device, wherein the mechanical battery-exchanging mechanism and the battery holding mechanism are configured to be actuated to exchange a battery in the battery holding mechanism of the portable device accessory with a battery in the input device by an insertion of the portable device accessory into and/or removal of the portable device accessory from the interface.

12. The system of claim 11, wherein the battery-switching mechanism comprises a turntable disposed within the input device, the turntable being configured to hold two or more batteries.

13. The system of claim 12, wherein the battery-switching mechanism further comprises a sliding tray assembly onto which the turntable is rotatably mounted and which is configured to slide relative to a body of the input device.

14. The system of claim 13, further comprising:

a rotation post associated with the turntable; and a pawl associated with the body of the input device, the pawl being configured to engage the rotation post when the portable device accessory is inserted into the portable device accessory interface such that movement of the sliding tray assembly away from an opening of the interface causes rotation of the tray, and also being configured to move out of a path of rotation post when the portable device accessory is removed from the input device.

15. The system of claim 14, wherein the device further comprises a portable device accessory storage area accessible via the interface, wherein the pawl further comprises a pawl guide, wherein the sliding tray assembly comprises a face with a pawl groove within which the pawl guide travels as the sliding tray assembly is moved, wherein the pawl groove comprises a notch configured to retain the sliding tray assembly in a portable device accessory storage position when the pawl guide is located in the notch, and wherein the sliding tray assembly can be pushed to cause the pawl guide to move from the notch and to allow the sliding tray assembly to move to a portable device accessory removal position closer to an opening of the interface.

* * * * *